United States Patent [19]
Hoshika

[11] 4,060,725
[45] Nov. 29, 1977

[54] FOCAL PLANE DETECTING DEVICE

[75] Inventor: Shuji Hoshika, Wako, Japan

[73] Assignee: Asahi Kogaku Kogyo Kabushiki Kaisha, Tokyo, Japan

[21] Appl. No.: 667,320

[22] Filed: Mar. 16, 1976

[30] Foreign Application Priority Data

Mar. 17, 1975 Japan .................. 50-32027

[51] Int. Cl.$^2$ .................. G02B 5/14; H01J 5/16; H01J 39/12
[52] U.S. Cl. .................. 250/227; 250/201
[58] Field of Search .................. 250/227, 237 R, 201, 250/233, 236; 356/122, 121

[56] References Cited
U.S. PATENT DOCUMENTS

| | | | |
|---|---|---|---|
| 3,356,854 | 12/1967 | Humphrey | 356/122 |
| 3,480,786 | 11/1969 | Kottman | 250/227 |

*Primary Examiner*—Harold A. Dixon
*Assistant Examiner*—David K. Moore
*Attorney, Agent, or Firm*—Sughrue, Rothwell, Mion, Zinn and Macpeak

[57] ABSTRACT

A focal plane detecting device is disclosed which uses an optical fiber system located within a rotating motor shaft or the like to scan an image plane and to deliver the scanned light to a stationary means, such as a photoconductor for developing a contrast signal. The optical system includes at least one optical fiber having its light incident end a fixed distance away from the axis of rotation of the shaft, but facing in the axial direction so as to scan a circular-like pattern of the plane wherein the light incident surface exists. The optical fiber extends through the shaft and exits in such a manner as to direct light therefrom upon a light detector at least part of the time that the shaft is rotating. Preferably the optical system includes a pair of optical fibers each having light incident ends symmetrically about the axis of rotation of the shaft and separated by a distance of $\Delta Z$ along the axis of rotation. The axial separation results in the two optical fibers scanning corresponding potions of two image planes separated by $\Delta Z$. This permits the development of image signals representing the slightly separated planes and the comparison of said signals with each other to determine the position of the focal plane relative to the two image planes.

10 Claims, 7 Drawing Figures

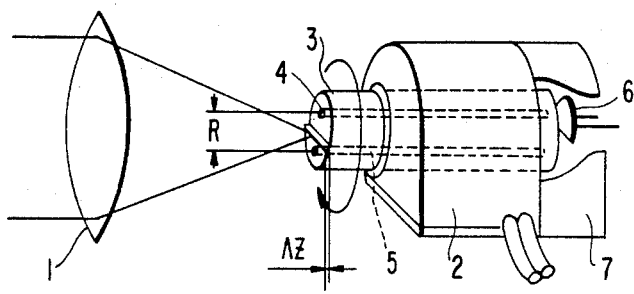
FIG 1
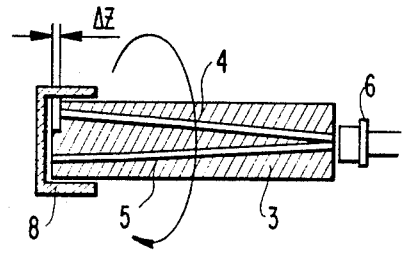
FIG 2
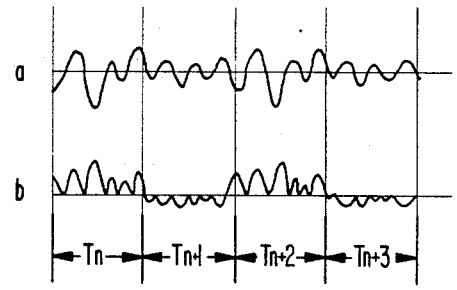
FIG 3
FIG 4
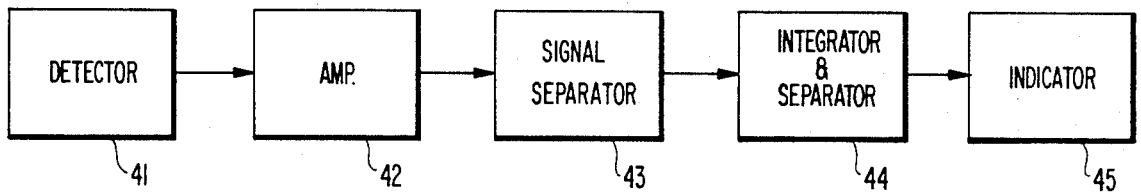
FIG 5a
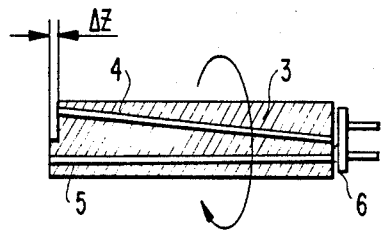
FIG 5b
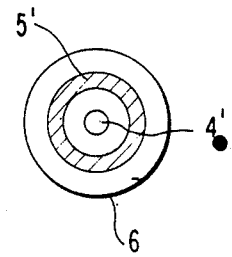

FOCAL PLANE DETECTING DEVICE

BACKGROUND OF THE INVENTION

The present invention relates to a device for detecting the focal plane in an optical apparatus, such as a camera.

In focal plane detecting means it is known to utilize the fact that the contrast of an image assumes its maximum in the focal plane i.e., the difference between bright and dark portions is greatest. As an expedient for obtaining a signal corresponding to the contrast the image surface is scanned by vibrating an element and a slit using an excitor or by rotating a disc formed with a slit on the shaft of a motor.

However, the method for scanning the image surface by means of an excitor carries out a high speed scan, and hence, when vibration is applied at a high frequency, the exciting amplitude decreases with such vibration. From this, the above-mentioned method poses a drawback such that a sufficient contrast signal may not be obtained unless an object has a high space frequency. Also, according to the method wherein the image surface is scanned by rotation of a slotted disc, the range to be scanned may suitably be varied by varying position from the center of rotation to the slot. However there still remains the problem of how to stabilize the signal from a photoconductive element disposed rearwardly of the slot. For example, in Japanese Patent Publication No. 43-25723, such a signal is obtained by a slide ring and a brush, but the contact resistance therebetween always varies during rotation of the motor shaft, with the result that it is difficult to stably obtain a minute output signal. Further, since the motor shaft must have various mechanisms mounted thereon, the motor requires a high degree of torque in order to achieve a high speed of rotation. This is a disadvantage in terms of electric power consumed.

SUMMARY OF THE INVENTION

The present invention provides a focal plane detecting device which overcomes those disadvantages noted above. The rotary shaft of a motor is aligned in the direction of an optical axis of a lens, and two ray-transmission bodies, such as optical fibers of which opposite ends are polished, are extended through a shaft of the motor. On the ray incident side, the two optical fibers are arranged symmetrically with respect to the axis of rotation of the shaft. Further, the two optical fibers have their tips displaced by $\Delta Z$ in an axial direction. On the ray emergence side, the opposite ends of the optical fibers are placed in the same plane. When the motor is rotated, two image surfaces, separated by a distance of $\Delta Z$ in the direction of optical axis, are scanned. A photoconductor is positioned slightly away from the end surfaces of the optical fibers on the ray emergence side thereof. The photoconductor has an area which includes one half of the circumferential locus of the end surfaces of the fibers. Consequently the photoconductor alternately produces image surface scanning signals corresponding to a portion of one half rotation of the two optical fibers. The image surface scanning signals corresponding to the two image surfaces spaced by $\Delta Z$ are separated electronically and compared, thus detecting the focal plane.

As is apparent from the foregoing, the present invention has various features. First, the optical system scanning the image surface is spatially separated from the photoconductive element so that rotation of the motor shaft is not transmitted to the photoconductive element. Consequently the photoconductive element may be fixedly mounted to result in the significant advantage that stabilized image surface scanning signals may always be obtained without requiring a mechanism for the transmission of signals such as a slide ring and a brush.

According to a second feature of the invention, by placing the light-weight optical fibers into the motor shaft, substantially no load is imposed on the motor, and therefore high speed scanning can be accomplished. This feature also reduces electric power consumption and increases the durability of the apparatus.

According to a third feature, since the apparatus of the present invention is capable of providing contrast signal in formation for the image at two surfaces separated by $\Delta Z$, such information can be used as the information for the front pin and rear pin (corresponding to points just in front and just in back of the film plane), and when combined with a servo system can be used to automatically focus a camera.

BRIEF DESCRIPTION OF THE DRAWINGS

FIG. 1 is a perspective view of one embodiment of an image surface scanning apparatus according to the present invention.

FIG. 2 is a cross sectional side view of a second embodiment of the present invention wherein a photoconductive element having a small light receiving area is used.

FIG. 3a shows image surface scanning signals which are continuously obtained according to the present device, and FIG. 3b shows a condition where the signals are separated into positive or negative only.

FIG. 4 shows one example of a processing circuit.

FIG. 5a is a cross sectional side view of a further embodiment of the present invention.

FIG. 5b is a front view of a light receiving surface of a light receiving element used in the embodiment of FIG. 5a.

DETAILED DESCRIPTION OF THE INVENTION

Figure 6:
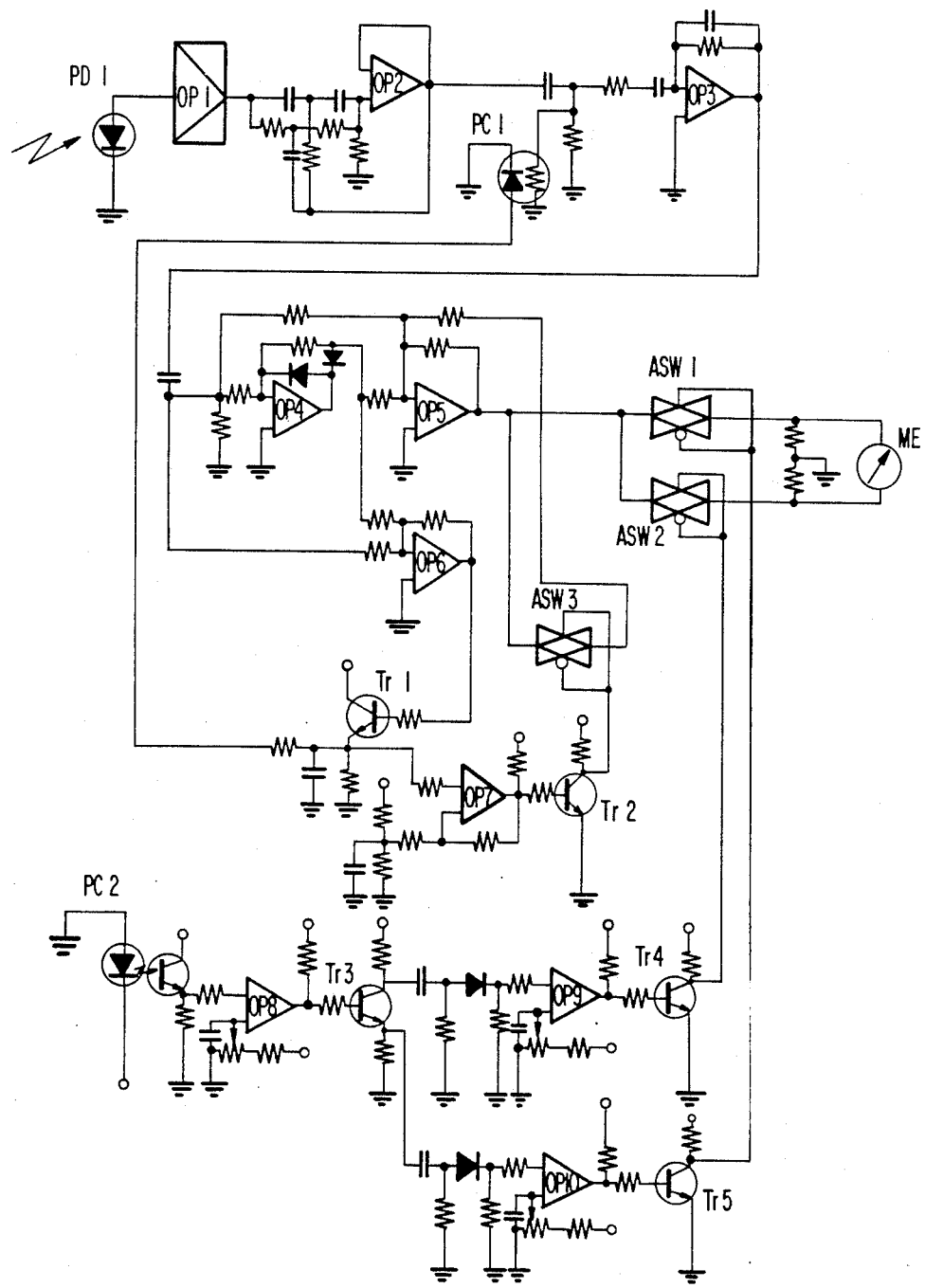
FIG. 6 is a specific example of the circuit used for the block diagram of FIG. 4.

FIG. 1 illustrates one example of an image surface scanning apparatus according to the present invention. The light from a scene passes through a lens 1 and forms an image in the vicinity of the end surface of a shaft 3 of a motor 2. A pair of optical fibers 4 and 5 extend through the shaft 3 parallel to one another and to the axis of rotation and have their end surfaces polished. The light rays enter the optical fibers at the light-incident surface thereof. At the light-emergence side of the optical fibers, the light exits and falls on a semi-circular photoconductive element 6. The latter element has an area including one half of a circumferential locus of the diameter R, which is the distance between fiber ends at the light-emergence side.

The optical fibers 4 and 5 are positioned symmetrically with respect to the axis of rotation of the shaft at the end surface thereof on the light-incident side, and are displaced by $\Delta Z$ in the direction of the optical axis. Accordingly, in FIG. 1, when the shaft 3 is rotated, image surface scanning signals developed by the photoconductor 6 alternately represent the image positions $\Delta Z$ apart. The photoconductive element 6 is preferably positioned as close as possible to the light emergence end of the optical fibers so as to eliminate any effect which light from the two optical fibers 4 and 5 could have on each other. The reference numeral 7 denotes a shield film for removing outside light rays from impinging on the photoconductor.

As may be understood from the foregoing embodiment, the optical system for scanning the image surface is spatially separated from the photoconductive element 6 so that the image surface scanning may be carried out in a manner such that rotational motion of the shaft 3 is not transmitted to the photoconductive element 6, with the result that the image surface scanning signals may stably and securely be obtained. Further, since the load on motor 2 is very small, the speed of rotation may easily be increased, thereby permitting the performance of simpler high speed scanning. High speed scanning is effective in detecting a focal plane under the alternative illumination as within a room. Moreover, it is advantageous in terms of durability and electric power consumption.

In the embodiment previously discussed, the two optical fibers are extended through the shaft in parallel fashion, and hence, a semi-circular photoconductive element having a wide light receiving area is required. FIG. 2 illustrates another embodiment, wherein two optical fibers extend through the shaft in such manner that their light emergence ends are substantially at or near the rotary axis, and wherein a small photoconductive element, for example, such as a photo-transistor, having a small light receiving area, is positioned so that light from both fibers always falls on the photoconductor. Alternation of the scanning signals is this case, between the first and second optical fibers, is provided by an image shield plate 8 having a half moon opening therein. Thus, at any given time only one of the optical fibers can receive light from the scene. The embodiment otherwise operates the same as that of FIG. 1.

In FIG. 3, waveform (a) illustrates conditions of the image surface scanning signals in the upper half portion on the same circumference distanced by $\Delta Z$ continuously and alternately obtained. The image surface scanning signal for one optical fiber is designated as the signal A, and the image surface scanning signal for the other optical fiber displaced by $\Delta Z$ is designated as the signal B. Thus signal A is generated during times $T_n$, $T_{n+2}$... and the signal B is generated during times $T_{n+1}$, $T_{n+3}$... . Assume now that the focal plane is closer to the scan surface of the optical fiber which generates the signal A than it is to the scan surface of the optical fiber which generates the signal B. In that case the signal A will have greater peaks and valleys (negative peaks) because of the greater contrast in the image nearest the image focal plane. Thus, as shown in FIG. 3 waveform (b), if the signal A is full-wave rectified into a positive signal and the signal B is similarly processed and thereafter inverted into a negative signal and the integral amount of the two signals are compared, then the one output in which the signal A is integrated becomes greater. If the focal plane is closer to the scan surface of the optical fiber which results in the generation of the signal B, then the other output in which the signal B is integrated becomes greater. If the focal plane is in the center of both the scan surfaces, both integral outputs become equal to each other. This arrangement may be utilized to detect the conditions of front pin, rear pin, and adjusted to detect the conditions of front pin, rear pin, and adjusted focus.

FIG. 4 shows one example of a process circuit, in which all of the elements shown are individually known. The reference numeral 41 denotes a signal detector circuit, 42 an amplifier circuit, 43 a signal separator circuit, 44 an integrating separator circuit, and 45 an indicating circuit.

A specific example of a circuit for carrying out the function of the block diagram of FIG. 4 is shown in FIG. 6. As shown the circuit includes a photo diode and nine operational amplifiers. Operational amplifier 1 operates as a log amplifier and operational amplifier 2 as a notch filter. PC1 is a photo coupler for a CdS LED. ASW1 is an analog switch for passing the signal alternately in synchronism with a half revolution of the motor shaft. ASW2 passes the signals in synchronism with the other half revolution of the motor shaft. ASW3 is an analog switch for switching gain in response to the magnitude of the input. PC2 is a photo coupler for detecting the ON and OFF status of light for a half revolution of the motor shaft. OP8 thru OP10 and Tr 3 thru Tr 5 constitutes a circuit for producing a synchronizing signal for a half revolution of the motor shaft. A meter ME is also provided for indicating whether the focused point is in front of the film plane (e.g. a (+) indication) or in back of the film plane (e.g. a(−) indication).

FIGS. 5a and 5b shows a further embodiment of the invention. That is, as shown in FIG. 5a, among two optical fibers 4 and 5 with their end surfaces on the incident side displaced by $\Delta Z$ along the optical axis, one optical fiber has its emergence end registered with the axis of rotation of the motor shaft 3 while the other optical fiber has its emergence surface suitably displaced from the axis of rotation. As shown in FIG. 5b, the light receiving element 6 has concentric light receiving surfaces 4' and 5' corresponding to the rotational positions of the emergence end surfaces of the optical fibers 4 and 5, respectively. In this specific embodiment, the scan signals in two scan surfaces separated by $\Delta Z$ may be obtained independently from each other, eliminating the need for a signal separation circuit, as is required in the previous embodiment.

While two optical fibers with end surfaces on the light-incident side displaced by $\Delta Z$ along the optical axis have been used to obtain information of the front pin and rear pin in those embodiments as described above, it is to be understood that a focal point detector for the sake of simplicity may also be designed so that one optical fiber is disposed with its incident surface displaced from the axis of rotation of the motor shaft and with its emergence surface registered with the axis of rotation, and the motor thus arranged is rotated to obtain scanning signals, whereby the focus is adjusted in position until the contrast signal assumes a maximum level.

Further, to meet a requirement for higher speed scanning, it will also be appreciated that a shaft incorporating a fiber optical system therein may be rotated by means of a motor with a pulley whose diameter is greater than the shaft, for example, by extension of a belt thereon, so as to realize high speed scanning.

While the optical fibers have been placed within the motor shaft for the convenience of description in the foregoing detailed description of the present invention, it should be noted that the optical fibers may be applied to not only a motor shaft but also to any rotary body.

As described above, in the present invention, the optical system for purposes of scanning image surfaces and the photoconductive element may spatially be separated with the photoconductive element fixed, and this eliminates the need of a mechanism to transmit signals such as a slide ring and a brush thereby offering a significant feature such that stabilized image surface scanning signals may always be obtained. Moreover, since all that need be done is to extend lightweight optical fibers through the motor shaft, the motor may be rotated with almost no load to thereby offer a possibility of higher speed scanning. In addition, the apparatus of the invention is an improvement in terms of electric power consumption and durability, can obtain information of front pin and rear pin, and can sufficiently overcome various disadvantages inherent to conventional focal plane detectors to thereby enhance its practicality.

What is claimed is:

1. Apparatus for developing a signal indicative of the contrast of an image of scene, said apparatus comprising a motor having a rotary body having first and second ends and a means for imparting rotation to said rotary body about a rotary axis, the first said end of said rotary body being adapted to have an image plane of a scene impinging thereon, optical fiber means positioned within said rotary body and extending generally in the direction of said rotary axis from said first end to said second end of said rotary body, the first and second ends of said optical fiber means being in light communication with the area just outside the first and second ends of said rotary body, whereby light in an image plane falling on said first end of said optical fiber is carried to the second end and directed outwardly of said second end of said optical fiber and said rotary body, the said first end of said optical fiber means being displaced from said axis of rotation to effect a circular scan of said image plane as said rotary body rotates, and photoconductor means positioned rearwardly of and stationary relative to said second end of said optical fiber means and said rotary body means for developing an electrical signal dependent upon the scene brightness in the image plane scanned circuit means separating and integrating said electrical signal for developing a further signal indicative of the contrast of said image, said optical fiber means comprising at least a first and a second optical fiber bundle, the first ends of both said optical fiber bundles being positioned symmetrically about said rotary axis, and the first end of said first optical fiber bundle being displaced axially a predetermined amount $\Delta Z$ relative to the first end of said second optical fiber bundle to effect scans of two image planes separated by $\Delta Z$ by said first and second optical fiber bundles, respectively.

2. Apparatus as claimed in claim 1 further comprising means for rendering said photoconductor alternately responsive to light rays from said first and second fiber bundles.

3. Apparatus as claimed in claim 1 wherein said first and second optical fiber bundles have their second ends positioned symmetrically about said rotary axis, and wherein said photoconductor means is shaped and positioned to receive light exiting from each said optical fiber bundles, alternately, as said rotary body rotates.

4. Apparatus as claimed in claim 1 wherein said photoconductor is half moon shaped and is positioned directly opposite a half moon portion of the second end of said rotary body.

5. Apparatus as claimed in claim 3 further comprising electronic means for separating the alternatingly generated signals representing scans of the two image planes separated by $\Delta Z$.

6. Apparatus as claimed in claim 1 further comprising a mask covering said first end of said rotary body, said mask defining an opening therein having a shape to permit the first ends of said optical fiber bundles to be unmasked during a portion of the rotation of said rotary body, the portion during which said first optical fiber bundle is unmasked being different than the portion during which said second optical fiber bundle is unmasked.

7. Apparatus as claimed in claim 6 wherein said mask defines a semicircular opening which includes the locus of the first end of said first optical fiber bundle during substantially one half of the rotation of the said rotary body, and includes the locus of the first end of said second optical fiber bundle during substantially the other half of the rotation of the said rotary body.

8. Apparatus as claimed in claim 6 wherein the second ends of said first and second optical bundles are positioned substantially on the rotary axis of said rotary body, and wherein said photoconductor means is positioned directly opposite the rotary axis of the second end of said rotary body.

9. Apparatus as claimed in claim 1 wherein the second ends of said first and second optical fiber bundles are positioned relative to said axis to define two non-overlapping and non-intersecting loci as said rotary body rotates, and wherein said photo conductor means comprises a plate having two patterned photosensitive portions, said latter two portions having patterns corresponding to said two loci, whereby one said photosensitive portion is responsive to light exiting from the said first optical fiber bundle and the other said photosensitve portion is responsive to light exiting from said second optical fiber bundle.

10. Apparatus as claimed in claim 1 wherein the first end of said rotary body is shaped so that one half of said end is displaced an amount $\Delta Z$ from the other half of said end, and wherein the first ends of said first and second optical fiber bundles are flush with said first and second halves, respectively.

* * * * *